US011292915B2

(12) United States Patent
Werner et al.

(10) Patent No.: US 11,292,915 B2
(45) Date of Patent: Apr. 5, 2022

(54) BLEND OF SURFACE MODIFIED CALCIUM CARBONATE COMPRISING PARTICLES (MCC) AND PRECIPITATED CALCIUM CARBONATE COMPRISING PARTICLES (PCC) AND ITS USES

(71) Applicant: Omya International AG, Oftringen (CH)

(72) Inventors: Dennis Werner, Olten (CH); Fritz Lehner, Zofingen (CH); Alain Cremaschi, Saint Germain la Ville (FR)

(73) Assignee: Omya International AG, Oftringen (CH)

( * ) Notice: Subject to any disclaimer, the term of this patent is extended or adjusted under 35 U.S.C. 154(b) by 40 days.

(21) Appl. No.: 15/557,573

(22) PCT Filed: Apr. 4, 2016

(86) PCT No.: PCT/EP2016/057321
§ 371 (c)(1),
(2) Date: Sep. 12, 2017

(87) PCT Pub. No.: WO2016/169753
PCT Pub. Date: Oct. 27, 2016

(65) Prior Publication Data
US 2018/0051175 A1 Feb. 22, 2018

Related U.S. Application Data

(60) Provisional application No. 62/153,025, filed on Apr. 27, 2015.

(30) Foreign Application Priority Data

Apr. 20, 2015 (EP) .................................... 15164345

(51) Int. Cl.
*C09C 1/02* (2006.01)
*C08K 3/26* (2006.01)
*C09C 1/00* (2006.01)
*C08K 9/10* (2006.01)
*C09D 7/42* (2018.01)
*C09D 7/62* (2018.01)
*C09J 11/04* (2006.01)
*D21H 17/67* (2006.01)
*D21H 17/00* (2006.01)
*D21H 19/38* (2006.01)

(52) U.S. Cl.
CPC .............. *C09C 1/024* (2013.01); *C08K 3/26* (2013.01); *C08K 9/10* (2013.01); *C09C 1/0081* (2013.01); *C09C 1/021* (2013.01); *C09C 1/022* (2013.01); *C09D 7/42* (2018.01); *C09D 7/62* (2018.01); *C09J 11/04* (2013.01); *D21H 17/67* (2013.01); *D21H 17/675* (2013.01); *D21H 17/73* (2013.01); *D21H 19/385* (2013.01); *C01P 2002/60* (2013.01); *C01P 2004/32* (2013.01); *C01P 2004/51* (2013.01); *C01P 2004/61* (2013.01); *C01P 2006/12* (2013.01); *C08K 2003/265* (2013.01)

(58) Field of Classification Search
None
See application file for complete search history.

(56) References Cited

U.S. PATENT DOCUMENTS

| | | | |
|---|---|---|---|
| 5,531,821 A | 7/1996 | Wu | |
| 5,584,923 A | 12/1996 | Wu | |
| 5,634,968 A | 6/1997 | Pfaller et al. | |
| 6,666,953 B1 | 12/2003 | Gane et al. | |
| 2008/0022901 A1 | 1/2008 | Buri et al. | |
| 2010/0133195 A1* | 6/2010 | Gane | B01J 20/043 210/667 |
| 2010/0180800 A1 | 7/2010 | Munchow | |
| 2013/0131249 A1 | 5/2013 | Munchow | |
| 2014/0366777 A1 | 12/2014 | Skrzypczak et al. | |
| 2015/0175806 A1 | 6/2015 | Gerard et al. | |
| 2015/0210559 A1 | 7/2015 | Skrzypczak et al. | |

FOREIGN PATENT DOCUMENTS

| | | | | |
|---|---|---|---|---|
| EP | 2014830 A1 | 1/2009 | | |
| EP | 2264108 A1 | 12/2010 | | |
| EP | 2264109 A1 | 12/2010 | | |
| EP | 2537900 A1 | 12/2012 | | |
| EP | 2684916 A1 | 1/2014 | | |
| WO | 2004083316 A1 | 9/2004 | | |
| WO | 2006105189 A1 | 10/2006 | | |
| WO | WO-2014009403 A1 * | 1/2014 | ............. | D21H 17/00 |

OTHER PUBLICATIONS

Hu et al. (Ind. Eng. Chem. Res., 2010, 49, 5625-5630). (Year: 2010).*
The International Search Report dated Jun. 17, 2016 for PCT Application No. PCT/EP2016/057321.
The Written Opinion of International Searching Authority dated Jun. 17, 2016 for PCT Application No. PCT/EP2016/057321.

* cited by examiner

*Primary Examiner* — Clare M Perrin
(74) *Attorney, Agent, or Firm* — Heslin Rothenberg Farley & Mesiti, P.C.

(57) ABSTRACT

The present invention relates to a process for producing an aqueous slurry comprising a blend of surface modified calcium carbonate comprising particles (MCC) and precipitated calcium carbonate comprising particles (PCC), an aqueous slurry comprising the blend, as well as the blend obtainable by drying the aqueous slurry and their uses in paper, paper coating, tissue paper, digital photo paper, paints, coatings, adhesives, plastics, waste water treating or waste water treating agents.

14 Claims, No Drawings

BLEND OF SURFACE MODIFIED CALCIUM CARBONATE COMPRISING PARTICLES (MCC) AND PRECIPITATED CALCIUM CARBONATE COMPRISING PARTICLES (PCC) AND ITS USES

CROSS-REFERENCE TO RELATED APPLICATIONS

This is a U.S. national phase of PCT Application No. PCT/EP2016/057321, filed Apr. 4, 2016, which claims priority to European Application No. 15164345.9, filed Apr. 20, 2015 and U.S. Provisional Application No. 62/153,025, filed Apr. 27, 2015.

The present invention relates to a process for producing an aqueous slurry comprising a blend of surface modified calcium carbonate comprising particles (MCC) and precipitated calcium carbonate comprising particles (PCC), an aqueous slurry comprising the blend, as well as the blend obtainable by drying the aqueous slurry and their uses in paper, paper coating, tissue paper, digital photo paper, paints, coatings, adhesives, plastics, waste water treating or waste water treating agents.

Today matting effects can be achieved by different means as long as they provide for a micro-roughness of the paint or coating film surface, wherein the incident light is scattered in a way that results in matted surface. The physics behind this is known. The conditions to obtain a perfectly matted effect without resorting to complete light absorption are to scatter the incoming light away from the specular reflectance angle. This means diffracting the directed light that illuminates the substrate causing diffuse scatter.

In paint and coating industries a variety of such matting agents are known and mixed into paints and coatings such as silica, waxes, organic materials and even fillers are added to form a micro-rough surface after the drying process of the paint or coating. It is recognized as a general rule that the higher the dosing of the matting agent in a paint or coating, the stronger the matting effect. In contrast, products with larger particle sizes are stronger in matting efficiency but the resulting paint or coating film surface is not so smooth. Matting agents with smaller average particle size distribution do not provide sufficient matting effect, but provide for a smoother paint or coating surface.

Japanese patent application JP-A-2003 147275 discloses a coating material composition comprising a binder component and a calcium carbonate treated with phosphoric acid. Said coating material provides for a matte surface providing that the treated calcium carbonate has a mean particle diameter of less than 10 µm, a BET specific surface area of 70-100 $m^2/g$ and oil absorption of 130-20 ml/100 g.

WO 2006/105189 A1 refers to aggregated particulate minerals and compositions comprising aggregated calcium carbonate. Said dry aggregated calcium carbonate beads have a weight median aggregate particle size $d_{50}$ of at least 5 µm and even a size of at least 100 µm. Said aggregated calcium carbonate beads are made into paper, paint, coatings or ceramics.

U.S. Pat. No. 5,634,968 refers to carbonate containing mineral fillers, more particularly for use as matting agents. Said mineral materials are natural and/or precipitated calcium carbonates with a $d_{50}$ of 9.6-20.5 µm, wherein ground natural calcium carbonates are preferred.

U.S. Pat. Nos. 5,531,821 and 5,584,923 disclose and claim acid resistant calcium carbonates made by mixing calcium carbonate with anionic salts and cationic salts. Said acid resistant calcium carbonate is being used in neutral to weakly acid paper making processes.

U.S. Pat. No. 6,666,953 disclose a pigment of filler containing natural carbonate which is treated with one or more providers of medium-strong to strong $H_3O^+$ ions and gaseous $CO_2$.

US 2008/0022901 refers to mineral pigments containing a dry product formed in situ by the multiple reaction between a calcium carbonate and the product or products of reaction of said carbonate with one or more moderately strong to strong $H_3O^+$ ion donators and the product or products of reaction of the said calcium carbonate with gaseous $CO_2$ formed in situ and/or originating from an external supply and one or more compounds of formula R—X.

EP 2 264 109 A1 and EP 2 264 108 A1 disclose a process for preparing a surface-reacted calcium carbonate and its use as well as a process to prepare a surface-reacted calcium carbonate implementing a weak acid, resulting products and uses thereof.

EP 2 684 916 A1 discloses ball-shaped spherical surface modified spherical calcium carbonate comprising mineral particles with a mean particle size diameter above 1 µm, and its use.

WO 2004/083316 A1 refers to mineral pigments containing a product formed in situ by the double and/or multiple reaction of between calcium carbonate and the reaction product or products of said carbonate with one or more moderately strong H3O+ ion donors and the reaction product or products of said carbonate with gaseous CO2 formed in situ and/or coming from an external supply, and least one aluminum silicate and/or at least one synthetic silica and/or at least one calcium silicate and/or at least one silicate of a monovalent salt such as sodium silicate and/or potassium silicate and/or potassium silicate and/or lithium silicate, preferably such as sodium silicate and/or at least one aluminum hydroxide and/or at least on sodium and/or potassium aluminate, used in papermaking applications, such as mass filling and/or paper coating.

However, the preparation of known matting agents typically comes along with a low productivity and high energy consumption for drying the materials and is thus highly energy- and cost-consuming. As a result, such matting agents are typically obtained in form of aqueous suspensions comprising relatively high amounts of water. More precisely, the solids content of aqueous suspensions comprising such materials is typically below 10 wt.-%, based on the total weight of the aqueous suspension.

Therefore, there is a continuous need for alternative processes for producing matting agents in form of an aqueous suspension having high solids content, and especially providing a higher productivity and lower energy consumption for drying such that the processes are less energy- and cost-consuming. Furthermore, it is desired to produce a matting agent which provides a sufficient matting performance, especially the same or even a better performance than existing matting agents at lower costs.

Accordingly, it is an objective of the present invention to provide a process for producing a matting agent in form of an aqueous suspension. A further objective of the present invention is to provide a process for producing a matting agent in form of an aqueous suspension having high solids content. Another objective of the present invention is to provide a process for producing a matting agent in form of an aqueous suspension providing a higher productivity and lower energy consumption for drying such that it is less energy- and cost-consuming. An even further objective is to provide a matting agent which provides a sufficient matting performance, especially the same or even a better performance than existing matting agents at lower costs.

The foregoing and other objectives are solved by a process for producing an aqueous slurry comprising a blend of surface modified calcium carbonate comprising particles (MCC) and precipitated calcium carbonate comprising particles (PCC). The process comprises the steps of:
 a) providing an aqueous slurry of surface modified calcium carbonate comprising particles (MCC),
 b) providing an aqueous slurry of precipitated calcium carbonate comprising particles (PCC),
 c) contacting said aqueous slurry of surface modified calcium carbonate comprising particles (MCC) of step a) with said aqueous slurry of precipitated calcium carbonate comprising particles (PCC) of step b) for obtaining an aqueous slurry comprising a blend of surface modified calcium carbonate comprising particles (MCC) and precipitated calcium carbonate comprising particles (PCC), and
 d) dewatering the aqueous slurry obtained in step c) for obtaining an aqueous slurry comprising a blend of surface modified calcium carbonate comprising particles (MCC) and precipitated calcium carbonate comprising particles (PCC),
wherein the blend comprises the surface modified calcium carbonate comprising particles (MCC) and the precipitated calcium carbonate comprising particles (PCC) in a weight ratio [MCC/PCC] of from 99:1 to 50:50.

The inventors surprisingly found that the foregoing process for producing an aqueous slurry comprising a blend of surface modified calcium carbonate comprising particles (MCC) and precipitated calcium carbonate comprising particles (PCC) enables the production of an aqueous suspension having high solids content. It was further observed that said process provides a higher productivity and lower energy consumption for drying such that it is less energy- and cost-consuming. Furthermore, the inventors found out that the process produces a matting agent with a sufficient matting performance, especially providing the same or even a better performance than existing matting agents.

Advantageous embodiments of the present invention are defined in the corresponding sub-claims.

According to one embodiment, the surface modified calcium carbonate comprising particles (MCC) in the aqueous slurry of step a) are substantially spherical surface modified calcium carbonate comprising particles (bMCC).

According to another embodiment, the surface modified calcium carbonate comprising particles (MCC) in the aqueous slurry of step a) have a) a median grain diameter $d_{50}$ of from 4 µm to 100 µm, preferably from 5 µm to 75 µm, more preferably from 10 µm to 55 µm, still more preferably from 15 µm to about 35 µm, determined by Malvern Mastersizer, and/or b) a BET specific surface area of ≥15 m²/g, and preferably from 20 m²/g to 200 m²/g, more preferably from 30 m²/g to 150 m²/g, even more preferably from 40 m²/g to 100 m²/g, measured using nitrogen and the BET method, and/or c) a particle size distribution $d_{98}/d_{50}$ of <3, more preferably ≤2.9, preferably in the range from 1.4 to 2.9.

According to yet another embodiment, the aqueous slurry of surface modified calcium carbonate comprising particles (MCC) of step a) comprises at least one processing agent in an amount of up to 8 wt.-%, preferably in amounts from 0.01 wt.-% to 5 wt.-%, more preferably from 0.05 wt.-% to 4 wt.-%, still more preferably from 0.2 wt.-% to 3 wt.-%, based on the total dry weight of the aqueous slurry.

According to one embodiment, the at least one processing agent is selected from the group comprising ferrous sulfate, ferric sulfate, ferrous chloride, ferric chloride, aluminum sulfate, aluminium chloride, and/or their hydrated forms, silicates, water-soluble cationic polymers, water-soluble amphoteric polymers, water-soluble non-ionic polymers and combinations thereof.

According to another embodiment, the precipitated calcium carbonate comprising particles (PCC) in the aqueous slurry of step b) have a) a median grain diameter $d_{50}$ from 0.1 to 100 µm, preferably from 0.25 to 50 µm, more preferably from 0.3 to 5 µm, and most preferably from 0.4 to 3 µm, determined by the sedimentation method, and/or b) a BET specific surface area in the range from 1 to 100 m²/g, preferably from 2 to 70 m²/g, more preferably from 3 to 50 m²/g, especially from 4 to 30 m²/g, measured using nitrogen and the BET method, and/or c) a particle size distribution $d_{98}/d_{50}$ of ≥3, more preferably ≥3.2, preferably in the range from 3.2 to 4.5.

According to yet another embodiment, the aqueous slurry a) of surface modified calcium carbonate comprising particles (MCC) of step a) and/or the aqueous slurry of precipitated calcium carbonate comprising particles (PCC) of step b) has solids content of at least 5 wt.-%, preferably from 5 to 60 wt.-%, more preferably from 10 to 35 wt.-%, and most preferably from 15 to 30 wt.-%, based on the total weight of the aqueous slurry, and/or b) obtained in step c) has solids content of at least 5 wt.-%, preferably from 5 to 40 wt.-%, more preferably from 10 to 35 wt.-%, and most preferably from 15 to 30 wt.-%, based on the total weight of the aqueous slurry, and/or c) obtained in step d) has solids content of at least 15 wt.-%, preferably from 15 to 50 wt.-%, more preferably from 20 to 45 wt.-%, and most preferably from 20 to 40 wt.-%, based on the total weight of the aqueous slurry.

According to one embodiment, the blend comprises a) the surface modified calcium carbonate comprising particles (MCC) and the precipitated calcium carbonate comprising particles (PCC) in a weight ratio [MCC/PCC] of from 95:5 to 65:35, and preferably from 90:10 to 70:30, and/or b) particles having a median grain diameter $d_{50}$ of from 5 µm 100 µm, preferably from 10 µm to 75 µm, more preferably from 15 µm to 50 µm, still more preferably from 20 µm to 35 µm, determined by the sedimentation method, and/or c) particles having a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, and/or d) particles having a particle size distribution $d_{98}/d_{50}$ of ≥2.0, more preferably >2.5, preferably in the range from >2.5 to 3.0.

According to a further aspect of the present invention, an aqueous slurry obtained according to the process, as defined herein, is provided. The aqueous slurry comprising a blend of surface modified calcium carbonate comprising particles (MCC) and precipitated calcium carbonate comprising particles (PCC) in a weight ratio [MCC/PCC] of from 99:1 to 50:50.

According to another aspect of the present invention, a blend obtained by drying the aqueous slurry, as defined herein, is provided. The blend comprises surface modified calcium carbonate comprising particles (MCC) and precipitated calcium carbonate comprising particles (PCC) in a weight ratio [MCC/PCC] of from 99:1 to 50:50.

According to still another aspect of the present invention, a use of the blend of surface modified calcium carbonate comprising particles (MCC) and precipitated calcium carbonate comprising particles (PCC) of the aqueous slurry, as defined herein, or the blend, as defined herein, in paper, paper coating, tissue paper, digital photo paper, paints, coatings, adhesives, plastics, waste water treating or waste water treating agents is provided. In one embodiment, the blend of surface modified calcium carbonate comprising particles (MCC) and precipitated calcium carbonate comprising particles (PCC) of the aqueous slurry, as defined herein, or the blend, as defined herein, is preferably used as matting agent in paints and coatings. In another embodiment, the matting agent is present in amounts of 1 to 10 wt.-%, preferably of 2 to 7 wt.-%, more preferably of 3 to 5 wt.-%, based on the wet paint. In yet another embodiment, the surface of the dried paint or coating has a gloss at 85° in the range of below 10, preferably from 0.5-9.5, more preferably from 1 to 8, still more preferably from 2-7.5, when measured according to DIN 67 530.

According to an even further aspect of the present invention, paper, tissue paper, digital photo paper, paints, coatings, adhesives, plastics, or waste water treating agent comprising the blend of surface modified calcium carbonate comprising particles (MCC) and precipitated calcium carbonate comprising particles (PCC) of the aqueous slurry, as defined herein, or the blend, as defined herein, is provided.

In the following, it is referred to further details of the present invention and especially the foregoing steps of the process for producing an aqueous slurry comprising a blend of surface modified calcium carbonate comprising particles (MCC) and precipitated calcium carbonate comprising particles (PCC). It is to be understood that these technical details and embodiments also apply to the inventive products and their use. The term "slurry" or "suspension" in the meaning of the present invention comprises insoluble solids and water, and optionally further additives, and usually contains large amounts of solids and, thus, is more viscous and is typically of higher density than the liquid from which it is formed.

The term "aqueous" slurry or suspension refers to a system, wherein the liquid phase comprises, preferably consists of, water. However, said term does not exclude that the liquid phase of the aqueous suspension comprises minor amounts of at least one water-miscible organic solvent selected from the group comprising methanol, ethanol, acetone, acetonitrile, tetrahydrofuran and mixtures thereof. If the aqueous slurry comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous slurry. For example, the liquid phase of the aqueous slurry consists of water.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" even though such a limited understanding is always included by the terms "obtained" or "defined" as a preferred embodiment.

The inventive process for producing an aqueous slurry comprising a blend of surface modified calcium carbonate comprising particles (MCC) and precipitated calcium carbonate comprising particles (PCC) provides several advantages. Firstly, the inventive process provides an aqueous suspension having high solids content. Secondly, the inventive process provides a higher productivity and lower energy consumption for drying such that it is less energy- and cost-consuming. Additionally, the matting agent, i.e. the blend of surface modified calcium carbonate comprising particles (MCC) and precipitated calcium carbonate comprising particles (PCC), obtained by the inventive process has a sufficient matting performance, especially the same or even a better performance compared to existing matting agents, at lower costs.

Process Step a)

In step a) of the process of the present invention, an aqueous slurry of surface modified calcium carbonate comprising particles (MCC) is provided.

The aqueous surface modified calcium carbonate comprising particles slurry preferably has a solids content of at least 5 wt.-%, preferably from 5 to 60 wt.-%, more preferably from 10 to 35 wt.-%, and most preferably from 15 to 30 wt.-%, based on the total weight of the aqueous slurry. However, lower solids content such as below 5 wt.-% or higher solids content such as above 60 wt.-% could be used as well.

The water to be used for preparing the aqueous slurry of step a) is tap water, deionized water, process water or rain water, or a mixture thereof. Preferably, the water used for preparing the aqueous slurry of step a) is tap water.

The aqueous slurry of step a) comprises surface modified calcium carbonate comprising particles (MCC).

Preferably, the solids content of the aqueous slurry of step a) comprises surface modified calcium carbonate comprising particles (MCC). More preferably, the solids content of the aqueous slurry of step a) consists of surface modified calcium carbonate comprising particles (MCC).

"Surface-modified calcium carbonate comprising particles" (MCC) in the meaning of the present invention refers to particles of a natural calcium carbonate and/or precipitated calcium carbonate obtained by reacting it with an acid and with carbon dioxide, wherein the carbon dioxide is formed in situ by the acid treatment and/or is supplied from an external source. The acid treatment can be carried out with an acid having a $pK_a$ at 25° C. of 2.5 or less. If the $pK_a$ at 25° C. is 0 or less, the acid is preferably selected from sulphuric acid, hydrochloric acid, or mixtures thereof. If the $pK_a$ at 25° C. is from 0 to 2.5, the acid is preferably selected from $H_2SO_3$, $M^+HSO_4^-$ ($M^+$ is an alkali metal ion selected from the group comprising sodium and potassium), $H_3PO_4$, oxalic acid or mixtures thereof.

In one embodiment, the surface modified calcium carbonate comprising particles (MCC) are substantially spherical surface modified calcium carbonate comprising particles (bMCC).

Within the context of the present invention, "substantially spherical" shaped means that the appearance of the spherical surface modified calcium carbonate comprising particles is globular or ball-shaped.

Substantially spherical surface modified calcium carbonate comprising particles (bMCC) can be obtained by a process as defined in EP 2 684 916 A1, which is herein incorporated by reference.

According to one embodiment, the amount of calcium carbonate in the surface modified calcium carbonate comprising particles (MCC), preferably the substantially spherical surface modified calcium carbonate comprising particles (bMCC), is at least 50 wt.-%, e.g. at least 60 wt.-%, preferably between 50 and 100 wt.-%, more preferably between 60 and 99.9 wt.-% and most preferably between 70 and 99.8 wt.-%, based on the total dry weight of the surface modified calcium carbonate comprising particles (MCC), preferably the substantially spherical surface modified calcium carbonate comprising particles (bMCC). In one preferred embodiment, the amount of calcium carbonate in the surface modified calcium carbonate comprising particles (MCC), preferably the substantially spherical surface modified calcium carbonate comprising particles (bMCC), is between 80 and 99.8 wt.-%, more preferably between 90 and 99.8 wt.-% and most preferably between 96 and 99.8-wt.-%, based on the total dry weight of the surface modified calcium carbonate comprising particles (MCC), preferably the substantially spherical surface modified calcium carbonate comprising particles (bMCC).

The term "dry" calcium carbonate comprising particles in the meaning of the present invention is understood to refer to calcium carbonate comprising particles having a total surface moisture content of less than 0.5 wt.-%, preferably less than 0.2 wt.-% and more preferably less than 0.1 wt.-%, based on the total weight of the particles.

The surface modified calcium carbonate comprising particles (MCC), preferably the substantially spherical surface modified calcium carbonate comprising particles (bMCC), have a median grain diameter $d_{50}$ of from 4 µm to 100 µm, preferably from 5 µm to 75 µm, more preferably from 10 µm to 55 µm, still more preferably from 15 µm to about 35 µm, determined by Malvern Mastersizer.

Throughout the present document, the "particle size" of a calcium carbonate and other materials is described by its distribution of particle sizes. The value $d_x$ represents the diameter relative to which x % by weight of the particles have diameters less than $d_x$.

This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger and the remaining 50 wt.-% of grains smaller than this particle size. For the purpose of the present invention the particle size is specified as weight median particle size $d_{50}$ unless indicated otherwise. For determining the weight median particle size $d_{50}$ value a Sedigraph, i.e. the sedimentation method, can be used. For the purpose of the present invention, the "particle size" of surface-modified calcium carbonate is described as volume determined particle size distributions. For determining the volume determined particle size distribution, e.g. the volume median grain diameter ($d_{50}$) or the volume determined top cut particle size ($d_{98}$) of surface-modified calcium carbonate, a Malvern Mastersizer 2000 can be used.

Additionally or alternatively, the surface modified calcium carbonate comprising particles (MCC), preferably the substantially spherical surface modified calcium carbonate comprising particles (bMCC), have a particle size distribution $d_{98}/d_{50}$ of <3, more preferably ≤2.9, and most preferably in the range from 1.4 to 2.9. For example, the surface modified calcium carbonate comprising particles (MCC), preferably the substantially spherical surface modified calcium carbonate comprising particles (bMCC), have a particle size distribution $d_{98}/d_{50}$ in the range from 1.4 to 2.8, preferably in the range from 1.5 to 2.7, most preferably in the range from 1.6 to 2.6 or in the range from 1.7 to 2.5.

Additionally or alternatively, the surface modified calcium carbonate comprising particles (MCC), preferably the substantially spherical surface modified calcium carbonate comprising particles (bMCC), have a BET specific surface area of ≥15 m$^2$/g, and preferably from 20 m$^2$/g to 200 m$^2$/g, more preferably from 30 m$^2$/g to 150 m$^2$/g, even more preferably from 40 m$^2$/g to 100 m$^2$/g, measured using nitrogen and the BET method.

A "specific surface area (SSA)" of a calcium carbonate in the meaning of the present invention is defined as the surface area of the calcium carbonate divided by its mass. As used herein, the specific surface area is measured by nitrogen gas adsorption using the BET isotherm (ISO 9277:2010) and is specified in m$^2$/g.

Thus, in one embodiment the surface modified calcium carbonate comprising particles (MCC), preferably the substantially spherical surface modified calcium carbonate comprising particles (bMCC), have
  a) a median grain diameter $d_{50}$ of from 4 µm to 100 µm, preferably from 5 µm to 75 µm, more preferably from 10 µm to 55 µm, still more preferably from 15 µm to about 35 µm, determined by Malvern Mastersizer, or
  b) a BET specific surface area of ≥15 m$^2$/g, and preferably from 20 m$^2$/g to 200 m$^2$/g, more preferably from 30 m$^2$/g to 150 m$^2$/g, even more preferably from 40 m$^2$/g to 100 m$^2$/g, measured using nitrogen and the BET method, or
  c) a particle size distribution $d_{98}/d_{50}$ of <3, more preferably ≤2.9, most preferably in the range from 1.4 to 2.9.

In an alternative embodiment, the surface modified calcium carbonate comprising particles (MCC), preferably the substantially spherical surface modified calcium carbonate comprising particles (bMCC), have
  a) a median grain diameter $d_{50}$ of from 4 µm to 100 µm, preferably from 5 µm to 75 µm, more preferably from 10 µm to 55 µm, still more preferably from 15 µm to about 35 µm, determined by Malvern Mastersizer, and
  b) a BET specific surface area of ≥15 m$^2$/g, and preferably from 20 m$^2$/g to 200 m$^2$/g, more preferably from 30 m$^2$/g to 150 m$^2$/g, even more preferably from 40 m$^2$/g to 100 m$^2$/g, measured using nitrogen and the BET method, and
  c) a particle size distribution $d_{98}/d_{50}$ of <3, more preferably ≤2.9, most preferably in the range from 1.4 to 2.9.

In one embodiment, the surface modified calcium carbonate comprising particles (MCC), preferably the substantially spherical surface modified calcium carbonate comprising particles (bMCC), have a BET specific surface area from 30 m$^2$/g to 90 m$^2$/g and a median grain diameter $d_{50}$ from 10 µm to 55 µm.

The aqueous slurry of surface modified calcium carbonate comprising particles (MCC), preferably of the substantially spherical surface modified calcium carbonate comprising particles (bMCC), may comprise at least one processing agent.

The term "at least one" processing agent in the meaning of the present invention means that the processing agent comprises, preferably consists of, one or more processing agent(s).

In one embodiment of the present invention, the at least one processing agent comprises, preferably consists of, one processing agent. Alternatively, the at least one processing agent comprises, preferably consists of, two or more processing agents. For example, the at least one processing agent comprises, preferably consists of, two or three processing agents.

Preferably, the at least one processing agent comprises, more preferably consists of, one processing agent.

In case the aqueous slurry of surface modified calcium carbonate comprising particles (MCC), preferably of the substantially spherical surface modified calcium carbonate comprising particles (bMCC), comprises at least one processing agent, the aqueous slurry comprises the at least one processing agent preferably in an amount of up to 8 wt.-%, preferably in amounts from 0.01 wt.-% to 5 wt.-%, more preferably from 0.05 wt.-% to 4 wt.-%, still more preferably from 0.2 wt.-% to 3 wt.-%, based on the total dry weight of the aqueous slurry.

The at least one processing agent is typically added during the preparation of the aqueous slurry of surface modified calcium carbonate comprising particles (MCC), preferably of the substantially spherical surface modified calcium carbonate comprising particles (bMCC).

Preferably, the aqueous slurry of surface modified calcium carbonate comprising particles (MCC) comprises at least one processing agent if the surface modified calcium carbonate comprising particles (MCC) are substantially spherical surface modified calcium carbonate comprising particles (bMCC).

During the production of the substantially spherical surface modified calcium carbonate comprising particles (bMCC), the at least one processing agent functions as a coagulating agent promoting the assembly of calcium carbonate containing mineral particles which upon further exposure to the chemicals in the process provide for the substantially spherical surface modified calcium carbonate containing particles. With regard to the production of the substantially spherical surface modified calcium carbonate comprising particles (bMCC), reference is made to the process as defined in EP 2 684 916 A1, which is herein incorporated by reference.

Said at least one processing agent is preferably selected from the group comprising ferrous sulfate, ferric sulfate, ferrous chloride, ferric chloride, aluminum sulfate, aluminium chloride, and/or their hydrated forms, silicates, water-soluble cationic polymers, water-soluble amphoteric polymers, water-soluble non-ionic polymers and combinations thereof.

In a particular embodiment, the at least one processing agent is aluminum sulfate. In a further particular embodiment, the at least one processing agent is aluminum sulfate in its hydrated form. In a preferred embodiment, the at least one processing agent is aluminum sulfate hexadecahydrate.

For example, the content of the aluminum sulfate in the aqueous slurry of surface modified calcium carbonate comprising particles (MCC), preferably of the substantially spherical surface modified calcium carbonate comprising particles (bMCC), is up to 4 wt.-%, preferably in the range from about 0.1 wt.-% to about 2 wt.-%, more preferably from about 0.2 wt.-% to about 1 wt.-%, based on the total dry weight of the aqueous slurry. It has to be considered that the content of aluminum sulfate is crucial thus dosing of the hydrate requires the corresponding adaption to achieve the desired amount.

Process Step b)

In step b) of the process of the present invention, an aqueous slurry of precipitated calcium carbonate comprising particles (PCC) is provided.

The aqueous precipitated calcium carbonate comprising particles slurry preferably has a solids content of at least 5 wt.-%, preferably from 5 to 60 wt.-%, more preferably from 10 to 35 wt.-%, and most preferably from 15 to 30 wt.-%, based on the total weight of the aqueous slurry. In an alternative embodiment, the aqueous precipitated calcium carbonate comprising particles slurry preferably has a solids content of from 5 to 60 wt.-%, more preferably from 20 to 60 wt.-%, even more preferably from 30 to 60 wt.-%, and most preferably from 40 to 60 wt.-%, based on the total weight of the aqueous slurry. However, lower solids content such as below 5 wt.-% or higher solids content such as above 60 wt.-% could be used as well.

In a preferred embodiment, the aqueous precipitated calcium carbonate comprising particles slurry has a solids content of from 40 to 60 wt.-% such as from 45 to 60 wt.-%, based on the total weight of the aqueous slurry. Such high solids content is advantageous in order to obtain an aqueous slurry comprising a blend of surface modified calcium carbonate comprising particles (MCC) and precipitated calcium carbonate comprising particles (PCC) providing high solids content. This is favorable as less water needs to be eliminated and therefore provides a higher productivity and lower energy consumption for drying such that the process is less energy- and cost-consuming.

The water to be used for preparing the aqueous slurry of step b) is tap water, deionized water, process water or rain water, or a mixture thereof. Preferably, the water used for preparing the aqueous slurry of step b) is tap water.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic, calcitic or scalenohedral mineralogical crystal forms. Preferably, the precipitated calcium carbonate comprising particles (PCC) is one of the aragonitic, vateritic, calcitic or scalenohedral mineralogical crystal forms. More preferably, the precipitated calcium carbonate comprising particles (PCC) is the scalenohedral mineralogical crystal form (sPCC).

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered, dried and re-suspended in water.

According to one embodiment, the amount of calcium carbonate in the precipitated calcium carbonate comprising particles (PCC) is at least 50 wt.-%, e.g. at least 60 wt.-%, preferably between 50 and 100 wt.-%, more preferably between 60 and 99.9 wt.-% and most preferably between 70 and 99.8 wt.-%, based on the total dry weight of the precipitated calcium carbonate comprising particles (PCC). In one preferred embodiment, the amount of calcium carbonate in the precipitated calcium carbonate comprising particles (PCC) is between 80 and 99.8 wt.-%, more preferably between 90 and 99.8 wt.-% and most preferably between 96 and 99.8 wt.-%, based on the total dry weight of the precipitated calcium carbonate comprising particles (PCC).

The precipitated calcium carbonate comprising particles (PCC) preferably have a median grain diameter $d_{50}$ from 0.1 to 100 μm, preferably from 0.25 to 50 μm, more preferably from 0.3 to 5 μm, and most preferably from 0.4 to 3 μm, determined by the sedimentation method.

Preferably, the precipitated calcium carbonate comprising particles (PCC) have a particle size distribution $d_{98}/d_{50}$ value being above the corresponding value of the surface modified calcium carbonate comprising particles (MCC), preferably the substantially spherical surface modified calcium carbonate comprising particles (bMCC). For example, the precipitated calcium carbonate comprising particles (PCC) have a particle size distribution $d_{98}/d_{50}$ of ≥3, more preferably ≥3.2, preferably in the range from 3.2 to 4.5. In one embodiment, the precipitated calcium carbonate comprising particles (PCC) have a particle size distribution $d_{98}/d_{50}$ of in the range from 3.5 to 4.2 such as from 3.7 to 4.0.

Additionally or alternatively, the precipitated calcium carbonate comprising particles (PCC) has a BET specific surface area in the range from 1 to 100 $m^2/g$, preferably from 2 to 70 $m^2/g$, more preferably from 3 to 50 $m^2/g$, especially from 4 to 30 $m^2/g$, measured using nitrogen and the BET method.

Thus, in one embodiment the precipitated calcium carbonate comprising particles (PCC) have
a) a median grain diameter $d_{50}$ from 0.1 to 100 μm, preferably from 0.25 to 50 μm, more preferably from 0.3 to 5 μm, and most preferably from 0.4 to 3 μm, determined by the sedimentation method, and
b) a BET specific surface area in the range from 1 to 100 $m^2/g$, preferably from 2 to 70 $m^2/g$, more preferably from 3 to 50 $m^2/g$, especially from 4 to 30 $m^2/g$, measured using nitrogen and the BET method, and
c) a particle size distribution $d_{98}/d_{50}$ of ≥3, more preferably ≥3.2, preferably in the range from 3.2 to 4.5.

In an alternative embodiment, the precipitated calcium carbonate comprising particles (PCC) have
a) a median grain diameter $d_{50}$ from 0.1 to 100 μm, preferably from 0.25 to 50 μm, more preferably from 0.3 to 5 μm, and most preferably from 0.4 to 3 μm, determined by the sedimentation method, or
b) a BET specific surface area in the range from 1 to 100 $m^2/g$, preferably from 2 to 70 $m^2/g$, more preferably from 3 to 50 $m^2/g$, especially from 4 to 30 $m^2/g$, measured using nitrogen and the BET method, or
c) a particle size distribution $d_{98}/d_{50}$ of ≥3, more preferably ≥3.2, preferably in the range from 3.2 to 4.5.

It is preferred that the aqueous slurry of precipitated calcium carbonate comprising particles (PCC) of step b) is free of processing agents selected from the group comprising ferrous sulfate, ferric sulfate, ferrous chloride, ferric chloride, aluminum sulfate, aluminium chloride, and/or their hydrated forms, silicates, water-soluble cationic polymers, water-soluble amphoteric polymers, water-soluble non-ionic polymers and combinations thereof. More preferably, the aqueous slurry of precipitated calcium carbonate comprising particles (PCC) of step b) is free of processing agents.

Process Step c)

In step c) of the process of the present invention, the aqueous slurry of surface modified calcium carbonate comprising particles (MCC) of step a) is contacted with the aqueous slurry of precipitated calcium carbonate comprising particles (PCC) of step b). In process step c), an aqueous slurry comprising a blend of surface modified calcium carbonate comprising particles (MCC) and precipitated calcium carbonate comprising particles (PCC) is obtained.

The contacting of the aqueous slurry of surface modified calcium carbonate comprising particles (MCC) of step a) with the aqueous slurry of precipitated calcium carbonate comprising particles (PCC) of step b) has the advantage that an aqueous slurry is obtained having higher solids content. Thus, less water needs to be eliminated and therefore provides a higher productivity and lower energy consumption for drying such that the process is less energy- and cost-consuming.

Contacting step c) can be accomplished by any conventional means known to the skilled person. Preferably, the contacting is carried out under mixing and/or homogenizing and/or particle dividing conditions. The skilled person will adapt these mixing and/or homogenizing and/or particle dividing conditions such as the mixing speed, dividing, and temperature according to his process equipment.

For example, the mixing and homogenizing may take place by means of a ploughshare mixer which is well known to the skilled person.

It is appreciated that process step c) is carried out in that the aqueous slurry of surface modified calcium carbonate comprising particles (MCC) of step a) is added to the aqueous slurry of precipitated calcium carbonate comprising particles (PCC) of step b). Alternatively, process step c) is carried out in that the aqueous slurry of precipitated calcium carbonate comprising particles (PCC) of step b) is added to the aqueous slurry of surface modified calcium carbonate comprising particles (MCC) of step a).

Preferably, process step c) is carried out in that the aqueous slurry of precipitated calcium carbonate comprising particles (PCC) of step b) is added to the aqueous slurry of surface modified calcium carbonate comprising particles (MCC) of step a).

According to one embodiment, process step c) is carried out at a temperature ranging from 15° C. to 80° C., preferably from 20° C. to 50° C. and most preferably from 20° C. to 40° C.

An aqueous slurry comprising a blend of surface modified calcium carbonate comprising particles (MCC) and precipitated calcium carbonate comprising particles (PCC) is obtained in process step c).

The aqueous slurry obtained in step c) has preferably solids content of at least 5 wt.-%, preferably from 5 to 40 wt.-%, more preferably from 10 to 35 wt.-%, and most preferably from 15 to 30 wt.-%, based on the total weight of the aqueous slurry. In one embodiment, the aqueous slurry obtained in step c) has preferably solids content of from 20 to 30 wt.-% such as from 25 to 30 wt.-%, based on the total weight of the aqueous slurry. Higher solids content such as above 40 wt.-% could be also obtained. Such high solids content is advantageous as less water needs to be eliminated and therefore the process provides a higher productivity and lower energy consumption for drying such that it is less energy- and cost-consuming.

The specific advantages are particularly obtained when the blend comprises the surface modified calcium carbonate comprising particles (MCC) and the precipitated calcium carbonate comprising particles (PCC) in a specific ratio.

Thus, it is required that the blend comprises the surface modified calcium carbonate comprising particles (MCC) and the precipitated calcium carbonate comprising particles (PCC) in a weight ratio [MCC/PCC] of from 99:1 to 50:50. Preferably, the blend comprises the surface modified calcium carbonate comprising particles (MCC) and the precipitated calcium carbonate comprising particles (PCC) in a weight ratio [MCC/PCC] of from 95:5 to 65:35, and more preferably from 90:10 to 70:30.

It is preferred that the blend comprises the surface modified calcium carbonate comprising particles (MCC) and the precipitated calcium carbonate comprising particles (PCC) in a specific overall median grain diameter $d_{50}$. For example, the blend comprises particles having a median grain diameter $d_{50}$ of from 5 µm 100 µm, preferably from 10 µm to 75 µm, more preferably from 15 µm to 50 µm, still more preferably from 20 µm to 35 µm, determined by the sedimentation method.

The particles in the blend may also have a specific particle size distribution. In particular, the blend may comprise particles having a particle size distribution $d_{98}/d_{50}$ of ≥2.0, more preferably >2.5, preferably in the range from >2.5 to 3.0.

Additionally or alternatively, the blend comprises the surface modified calcium carbonate comprising particles (MCC) and the precipitated calcium carbonate comprising particles (PCC) such that a specific overall BET specific surface area is obtained. For example, the blend comprises particles having a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method.

Thus, the blend comprising the surface modified calcium carbonate comprising particles (MCC) and the precipitated calcium carbonate comprising particles (PCC) preferably comprises, more preferably consists of, particles having a) a median grain diameter $d_{50}$ of from 5 µm 100 µm, preferably from 10 µm to 75 µm, more preferably from 15 µm to 50 µm, still more preferably from 20 µm to 35 µm, determined by the sedimentation method, and/or b) a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, and/or c) a particle size distribution $d_{98}/d_{50}$ of ≥2.0, more preferably >2.5, preferably in the range from >2.5 to 3.0.

In one embodiment, the blend comprising the surface modified calcium carbonate comprising particles (MCC) and the precipitated calcium carbonate comprising particles (PCC) preferably comprises, more preferably consists of, particles having a) a median grain diameter $d_{50}$ of from 5 µm 100 µm, preferably from 10 µm to 75 µm, more preferably from 15 µm to 50 µm, still more preferably from 20 µm to 35 µm, determined by the sedimentation method, or b) a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, or c) a particle size distribution $d_{98}/d_{50}$ of ≥2.0, more preferably >2.5, preferably in the range from >2.5 to 3.0.

In an alternative embodiment, the blend comprising the surface modified calcium carbonate comprising particles (MCC) and the precipitated calcium carbonate comprising particles (PCC) preferably comprises, more preferably consists of, particles having a) a median grain diameter $d_{50}$ of from 5 µm 100 µm, preferably from 10 µm to 75 µm, more preferably from 15 µm to 50 µm, still more preferably from 20 µm to 35 µm, determined by the sedimentation method, and b) a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, and c) a particle size distribution $d_{98}/d_{50}$ of ≥2.0, more preferably >2.5, preferably in the range from >2.5 to 3.0.

In case the aqueous slurry of surface modified calcium carbonate comprising particles (MCC) provided in step a) comprises at least one processing agent, it is appreciated that the aqueous slurry obtained in step c) preferably comprises the at least one processing agent in an amount of up to 4 wt.-%, preferably in amounts from 0.005 wt.-% to 2.5 wt.-%, more preferably from 0.025 wt.-% to 2 wt.-%, still more preferably from 0.1 wt.-% to 1.5 wt.-%, based on the total dry weight of the aqueous slurry obtained in step c).

Process Step d)

In step d) of the process of the present invention, the aqueous slurry obtained in step c) is dewatered.

The term "dewatering" in the meaning of the present invention means a reduction of water content and an increase of the solids content which is obtained by using a thermal and/or mechanical method.

Dewatering step d) can be carried out by any type of thermal and/or mechanical methods known to the skilled person for reducing the water content of calcium carbonate comprising aqueous slurries. For example, dewatering step d) can be preferably carried out mechanically or thermally such as by filtration, centrifugation, sedimentation in a settling tank, evaporation etc., preferably by jet- or spray drying.

Preferably, the aqueous slurry comprising a blend of surface modified calcium carbonate comprising particles (MCC) and precipitated calcium carbonate comprising particles (PCC) obtained in step c) is dewatered to solids content of at least 15 wt.-%, preferably from 15 to 50 wt.-%, more preferably from 20 to 45 wt.-%, and most preferably from 20 to 40 wt.-%, based on the total weight of the aqueous slurry.

It is appreciated that dewatering step d) is carried out such that the obtained aqueous slurry has a solids content being above the solids content of the aqueous slurry obtained in contacting step c).

As the blend in the aqueous slurry obtained in step c), the blend obtained in step d) comprises the surface modified calcium carbonate comprising particles (MCC) and precipitated calcium carbonate comprising particles (PCC) in a specific weight ratio.

Thus, it is preferred that the blend obtained in step d) comprises the surface modified calcium carbonate comprising particles (MCC) and the precipitated calcium carbonate comprising particles (PCC) in a weight ratio [MCC/PCC] of from 99:1 to 50:50. Preferably, the blend obtained in step d) comprises the surface modified calcium carbonate comprising particles (MCC) and the precipitated calcium carbonate comprising particles (PCC) in a weight ratio [MCC/PCC] of from 95:5 to 65:35, and more preferably from 90:10 to 70:30.

It is preferred that the blend obtained in step d) comprises the surface modified calcium carbonate comprising particles (MCC) and the precipitated calcium carbonate comprising particles (PCC) in a specific overall median grain diameter $d_{50}$. For example, the blend obtained in step d) comprises particles having a median grain diameter $d_{50}$ of from 5 µm 100 µm, preferably from 10 µm to 75 µm, more preferably from 15 µm to 50 µm, still more preferably from 20 µm to 35 µm, determined by the sedimentation method.

The particles in the blend obtained in step d) may also have a specific particle size distribution. In particular, the blend may comprise particles having a particle size distribution $d_{98}/d_{50}$ of ≥2.0, more preferably >2.5, preferably in the range from >2.5 to 3.0.

Additionally or alternatively, the blend obtained in step d) comprises the surface modified calcium carbonate comprising particles (MCC) and the precipitated calcium carbonate comprising particles (PCC) such that the particles have a specific overall BET specific surface area. For example, the blend obtained in step d) comprises particles having a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method.

Thus, the blend comprising the surface modified calcium carbonate comprising particles (MCC) and the precipitated calcium carbonate comprising particles (PCC) obtained in step d) preferably comprises, more preferably consists of, particles having
a) a median grain diameter $d_{50}$ of from 5 μm 100 μm, preferably from 10 μm to 75 μm, more preferably from 15 μm to 50 μm, still more preferably from 20 μm to 35 μm, determined by the sedimentation method, and/or
b) a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, and/or
c) a particle size distribution $d_{98}/d_{50}$ of ≥2.0, more preferably >2.5, preferably in the range from >2.5 to 3.0.

In one embodiment, the blend comprising the surface modified calcium carbonate comprising particles (MCC) and the precipitated calcium carbonate comprising particles (PCC) obtained in step d) preferably comprises, more preferably consists of, particles having
a) a median grain diameter $d_{50}$ of from 5 μm 100 μm, preferably from 10 μm to 75 μm, more preferably from 15 μm to 50 μm, still more preferably from 20 μm to 35 μm, determined by the sedimentation method, or
b) a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, or
c) a particle size distribution $d_{98}/d_{50}$ of ≥2.0, more preferably >2.5, preferably in the range from >2.5 to 3.0.

In an alternative embodiment, the blend comprising the surface modified calcium carbonate comprising particles (MCC) and the precipitated calcium carbonate comprising particles (PCC) obtained in step d) preferably comprises, more preferably consists of, particles having
a) a median grain diameter $d_{50}$ of from 5 μm 100 μm, preferably from 10 μm to 75 μm, more preferably from 15 μm to 50 μm, still more preferably from 20 μm to 35 μm, determined by the sedimentation method, and
b) a BET specific surface area of ≥5 m²/g, and preferably from 10 m²/g to 200 m²/g, more preferably from 20 m²/g to 150 m²/g, even more preferably from 30 m²/g to 100 m²/g, measured using nitrogen and the BET method, and
c) a particle size distribution $d_{98}/d_{50}$ of ≥2.0, more preferably >2.5, preferably in the range from >2.5 to 3.0.

In case the aqueous slurry of surface modified calcium carbonate comprising particles (MCC) provided in step a) comprises at least one processing agent, it is appreciated that the aqueous slurry obtained in step d) preferably comprises the at least one processing agent in an amount of up to 8 wt.-%, preferably in amounts from 0.01 wt.-% to 5 wt.-%, more preferably from 0.05 wt.-% to 4 wt.-%, still more preferably from 0.2 wt.-% to 3 wt.-%, based on the total dry weight of the aqueous slurry obtained in step d).

It is preferred that process step d) is carried out in the absence of dispersing agents. Thus, the blend of surface modified calcium carbonate comprising particles (MCC) and precipitated calcium carbonate comprising particles (PCC) is preferably free of dispersing agents. More preferably, process steps a), b), c) and d) are carried out in the absence of dispersing agents.

The process according to the present invention may further comprise an optional drying step e). In said drying step, the aqueous slurry obtained in dewatering step d) is dried to obtain a dried blend of surface modified calcium carbonate comprising particles (MCC) and precipitated calcium carbonate comprising particles (PCC).

The drying method applied to obtain a dry blend of surface modified calcium carbonate comprising particles (MCC) and precipitated calcium carbonate comprising particles (PCC) can be any kind of drying method well known to the skilled person.

Thus, the solids content of the dry blend of surface modified calcium carbonate comprising particles (MCC) and precipitated calcium carbonate comprising particles (PCC) obtained in optional drying step e) is in the range from 20.0 to 99.0 wt.-% and preferably in the range from 24.0 to 90.0 wt.-%, based on the total weight of the blend. For example, the solids content of the dry blend of surface modified calcium carbonate comprising particles (MCC) and precipitated calcium carbonate comprising particles (PCC) obtained in optional drying step e) is in the range from 20.0 to 60.0 wt.-% and preferably in the range from 24.0 to 50.0 wt.-%, based on the total weight of the blend.

If the process comprises a drying step e), it is appreciated that the drying step is carried out such that the obtained blend has a solids content being above the solids content of the aqueous slurry obtained in dewatering step d).

As regards the properties of the dry blend, it is referred to the properties set out when discussing process steps c) and d).

Use of the Invention

The inventive blend of surface modified calcium carbonate comprising particles (MCC) and precipitated calcium carbonate comprising particles (PCC) or the aqueous slurry comprising said blend of surface modified calcium carbonate comprising particles (MCC) and precipitated calcium carbonate comprising particles (PCC) may be used in paper, tissue paper, digital photo paper, paints, coatings, adhesives, plastics, or in waste water treatment or waste water treating agents.

In preferred embodiment, the inventive blend of surface modified calcium carbonate comprising particles (MCC) and precipitated calcium carbonate comprising particles (PCC) is used in paints or coatings as a matting agent. By matting agent, the applicant understands an agent being capable of scattering the incoming light away from the specular reflectance angle. This means diffracting the directed light that illuminates the substrate causing diffuse scatter.

In particular the matting agent is present in amounts of 1 to 10 wt.-%, preferably in amounts of 2 to 7 wt.-%, more preferably in amount of 3 to 5 wt.-%, based on the total weight of the paint or coating.

The paints or coatings comprising the inventive blend of surface modified calcium carbonate comprising particles (MCC) and precipitated calcium carbonate comprising particles (PCC) as matting agents in the amounts mentioned above provide for a surface gloss at 85° in the range of below 10 gloss units (GU), preferably from 0.5 to 9.5, more preferably from 1 to 8, still more preferably from 2 to 7.5, of the dried film of the paint or coating, when measured according to DIN 67 530, which is very surprising due to the low content of the matting agent.

A further advantage of the inventive blend of surface modified calcium carbonate comprising particles (MCC) and precipitated calcium carbonate comprising particles (PCC) present in amounts as described above is, that besides the matting effect of the dried film of the paint or coating, the surface of said dried paint or coating is smooth.

Thus, the inventive blend of surface modified calcium carbonate comprising particles (MCC) and precipitated calcium carbonate comprising particles (PCC) of the present invention when used in paints and/or coatings, provide for matt appearance while at the same time provide a haptic smooth surface.

The following examples are meant to illustrate the invention without restricting its scope:

EXAMPLES

Measurement Methods

The following measurement methods are used to evaluate the parameters given in the description, examples and claims.

BET Specific Surface Area (SSA) of a Material

The specific surface area is measured with nitrogen via the BET method according to ISO 9277 using a Gemini V sold by the company MICROMERITICS™, following conditioning of the sample by heating at 250° C. for a period of 30 minutes. Prior to such measurements, the sample is filtered within a Buchner funnel, rinsed with deionised water and dried overnight at 90° C. to 100° C. in an oven. Subsequently, the dry cake is ground thoroughly in a mortar and the resulting powder placed in a moisture balance at 130° C. until a constant weight is reached.

Solids Content of an Aqueous Slurry

The slurry solids content (also known as "dry weight") is determined using a Moisture Analyser HR73 commercially available from Mettler-Toledo with the following settings: temperature of 120° C., automatic switch off 3, standard drying, 5-20 g of slurry.

Particle Size Distribution (Mass % Particles with a Diameter <x) and Weight Median Diameter (d50) of Non-Surface Reacted Calcium Carbonate Comprising Material (i.e. Calcium Carbonate Starting Material)

Weight median grain diameter and grain diameter mass distribution of a particulate material such as calcium carbonate, are determined via the sedimentation method, i.e. an analysis of sedimentation behavior in a gravimetric field. The measurement is made with a Sedigraph™ 5120.

The method and instrument are known to the skilled person and are commonly used to determine grain size of fillers and pigments. The measurements is carried out in an aqueous solution of 0.1 wt-% $Na_4P_2O_7$. The samples were dispersed using a high speed mixer and ultrasound.

Median Grain Diameter $d_{50}$ and $d_{98}$ of Ball-Shaped Surface Modified Calcium Carbonate Containing Mineral Median grain diameter, $d_{50}$ and $d_{98}$, of ball-shaped surface modified calcium carbonate containing mineral was determined using a Malvern Mastersizer 2000 Laser Diffraction System, with a defined RI of 1.57 and iRI of 0.005, Malvern Application Software 5.60. The measurement was performed on an aqueous dispersion. The samples were dispersed using a high-speed stirrer. In this respect, the $d_{50}$ and $d_{98}$ values define the diameters, at which 50 vol. % or 98 vol. % of the particles measured, have a diameter smaller than $d_{50}$ or $d_{98}$ value, respectively.

Viscosity Measurements

A. ICI Viscosity According to EN ISO 2884-1

The ICI viscosity was measured according to EN ISO 2884-1 using a cone- and plate viscometer (Epprecht Instruments+Controls, Bassersdorf, Switzerland) at a shear rate of 10 000 1/s at a temperature of (23±0.2) ° C. The measured value after 15 s, which should be a constant value, depicts the measured viscosity of the sample.

B. Viscosity with a Paar Physica M301 PP25 Rheometer

This measurement was conducted with a Paar Physica M301 PP25 Rheometer, from the company Anton Paar GmbH, Austria, according to the following regime:

Temp.: 23° C.

Starting shear rate: 0.1 1/s

End shear rate: 100 1/s, with a logarithmic gradient of 10 measurement points per decade, and each measurement point taken after 5 seconds.

The measurement points are displayed in a decimal logarithmic manner, so that a linear plot with a negative slope results from this measurement. The x-axis of the graph represents the shear rate in a decimal logarithmic manner, and the y-axis depicts the measured viscosity in Pa·s.

Gloss of a Coated Surface

The Gloss values are measured at the listed angles according to DIN 67 530 on painted surfaces prepared with a coater gap of 150 μm on contrast cards. The contrast cards used are Leneta contrast cards, form 3-B-H, size 7⅝×11⅜ (194×289 mm), sold by the company Leneta, and distributed by Novamart, Stäfa, Switzerland. The gloss is measured with a gloss measurement device from the company Byk Gardner, Geretsried, Germany. The gloss is obtained by measuring 5 different points on the card with the gloss measurement device, and the average value is calculated by the device and can be derived from the display of the device.

Determination of Colour Values (Rx, Ry, Rz)

The colour values Rx, Ry, Rz are determined over the white and black fields of the Leneta contrast card, and are measured with a spectraflas SF 450 X spectrophotomer of the company Datacolor, Montreuil, France.

Contrast Ratio (Opacity) of a Coated Surface

Contrast ratio values are determined according to ISO 2814 at a spreading rate of 10±0.5 m²/l.

The contrast ratio is calculated as described by the equation below:

$$\text{Contrast ratio } [\%] = \frac{Ry_{black}}{Ry_{white}} \times 100\%$$

with $Ry_{black}$ and $Ry_{white}$ being obtained by the measurement of the color values.

Examples

The following illustrative examples of the invention for the preparation of ball shaped MCC was prepared in a jacketed steel reactor equipped with a laminar mixing system in a batch size of 10 m³. The solid content is adjusted to 20 wt.-% solids, as indicated in table 1.

The process comprises the steps of:
a) providing at least one aqueous calcium carbonate containing mineral slurry;
b) providing at least one water-soluble acid;
c) optionally providing further gaseous $CO_2$ via an external route;
d) contacting said aqueous calcium carbonate containing mineral slurry of step a) with said acid of step b) and with said $CO_2$ generated in situ and/or supplied externally of step c) under stirring conditions.
e) optionally dewatering the aqueous slurry.

The addition of the at least one water-soluble acid of step b) and the contacting of said aqueous calcium carbonate containing mineral slurry of step a) with said acid of step b) and with said $CO_2$ generated in situ and/or supplied externally of step d) take place in a stirred reactor under stirring conditions such as to develop an essentially laminar flow.

The marble used in the process of the present invention and indicated as H90 in table 1, is a commercially available product sold from the applicant sold under the brand name Hydrocarb® 90-ME 78%, which is a natural ground marble from Molde in Norway, having a top cut $d_{98}$ of 5 µm, and weight median particle size $d_{50}$ of 0.7 µm (size determined by Sedigraph), and provided in form of a slurry with solids content of 78 wt. % based on dry matter of the slurry and a viscosity of 400 mPas.

The mixing speed is adjusted to 48 rpm, and the temperature is adjusted to 70° C. Prior to the dosing of a 35 wt.-% of phosphoric acid solution, which is added over a period of 10 to 12 min., the processing agent aluminum sulfate hexadecahydrate was added at once to the calcium carbonate containing mineral slurry in amounts of about 0.3 wt.-%.

The reaction was mixed at the indicated mixing speeds and times according to table 1.

TABLE 1

| | Tank Conditions | | | | | $H_3PO_4$ 35 wt. % | | $Al_2(SO_4)_3$*16$H_2O$ | |
|---|---|---|---|---|---|---|---|---|---|
| | Batch Size ($m^3$) | Mixing Speed (rpm) | Target Slurry Solids wt. % | Feed Slurry Type | Temp. ° C. | dosing of wt. % | Added over a period of | Final conc. wt. % | Addition time |
| E1 | 10 | 48 | 20.0 | H90 | 70 | 20.0 | 12 min | 0.27 | b/a |
| E2 | 10 | 44 | 20.0 | H90 | 70 | 20.0 | 11 min | 0.27 | b/a | b/a means addition before acid

The particle size distribution (PSD) of examples E1 and E2 of synthesized MCC were measured by using a Malvern Mastersizer and the particle size distribution and the BET specific surface area SSA, as well as the top cut $d_{98}$ and the median grain diameter $d_{50}$ for the examples E1 and E2 are shown in table 2.

TABLE 2

| | | E1(J) | E2(S) |
|---|---|---|---|
| SSA | $m^2/g$ | 48 | 42 |
| $d_{50}$* | µm | 9.6 | 23.7 |
| $d_{98}$* | µm | 26 | 67 |
| $d_{98}/d_{50}$ | | 2.71 | 2.82 |

*determinded by Malvern Mastersizer, (J) Jet dried, (S) Spray dried

The slurry of example E2 obtained after the reaction was mixed and dried according to table 3, with a slurry of 54 wt-% of precipitated calcium carbonate commercially available (Omya AG), wherein the precipitated calcium carbonate is a scalenohedral shaped precipitated calcium carbonate (sPPC) having a top cut $d_{98}$ of 7 µm, a weight median particle size diameter of $d_{50}$ of 1.8 µm, and particle size of <2 µm of 60 wt %, determined by Sedigraph 5120, and a brightness Ry (C/2°, DIN 53163) of 97%. Further to this, the slurry E2 was first dried and then blended with the dry scalenohedral PCC as previously mentioned above in different ratios as shown in table 3.

TABLE 3

Composition of Dry Blends and Wet Blend dried

| | Dry blend | Dry Blend | Dry Blend | Dry Blend | Dry Blend | Dry Blend | Wet Blend dried* |
|---|---|---|---|---|---|---|---|
| Sample | R1 | DB1 | DB2 | DB3 | DB4 | DB5 | WBd1 |
| E2 (MCC) | 100 wt. % | 90 wt-% | 80 wt-% | 70 wt-% | 60 wt-% | 50 wt-% | 70 wt.-% |
| sPCC | 0 | 10 wt-% | 20 wt-% | 30 wt-% | 40 wt-% | 50 wt-% | 30 wt.-% |

TABLE 3-continued

Composition of Dry Blends and Wet Blend dried

| | Dry blend | Dry Blend | Dry Blend | Dry Blend | Dry Blend | Dry Blend | Wet Blend dried* |
|---|---|---|---|---|---|---|---|
| Ratio MCC/sPCC | 100/0 | 90/10 | 80/20 | 70/30 | 60/40 | 50/50 | 70/30 |
| State | dry solid | dry solid | dry solid | dry solid | dry solid | dry solid | dry solid |

*the wet blend is a mixture of 6.21 parts of 20 wt.-% MCC and 1 part of 54 wt.-% of sPCC, which corresponds to slurry of a blend of MCC/sPCC at a ratio of 70/30 and a solids content of 24.7 wt.-%.

The dry samples obtained of dry and wet blend dried of MCC and sPCC were tested in paints. For this, R1, DB1 to DB3 and WBd1 were mixed in formulations and compared with matting agents used in this area such as diatomaceous earths (R2-Celite 281). The dosage level of all matting agents was at 7 wt.-%. Said formulations further comprise common additives such as defoamers, dispersing agents, sodium hydroxide, fungicides, bactericides, titanium dioxide (rutile), talcum, fillers, pigments, thickeners, plasticizer, viscosity modifiers, water, and others known to the skilled person. Table 4 provides for the composition of the test paint.

TABLE 4

| Samples | | | R1 | DB1 | DB2 | DB3 | DB4 | DB5 | WBd1 | R2 |
|---|---|---|---|---|---|---|---|---|---|---|
| Ratio (MCC/sPCC) | | | 100/0 | 90/10 | 80/20 | 70/30 | 60/40 | 50/50 | 70/30 | — |
| Base Test Paint | | | | | | | | | | |
| Water (deionised) | kg | 21.32 | | | | | | | | |
| Calgon N neu | kg | 0.16 | | | | | | | | |
| Bermocoll Prime 3500 | kg | 0.43 | | | | | | | | |
| Sodium Hydroxide, 10% | kg | 0.21 | | | | | | | | |
| BYK 038 | kg | 0.27 | | | | | | | | |
| Texanol | kg | 0.27 | | | | | | | | |
| Butyl Diglycol Acetate | kg | 0.27 | | | | | | | | |
| Dowanol DPnB | kg | 0.53 | | | | | | | | |
| Coapur 2025 | kg | 0.11 | | | | | | | | |
| Byk 349 | kg | 0.21 | | | | | | | | |
| Mergal 723 K | kg | 0.11 | | | | | | | | |
| Water (deionised) | kg | 2.67 | | | | | | | | |
| Ecodis P90 | kg | 0.30 | | | | | | | | |
| Water (deionised) | kg | 8.00 | | | | | | | | |
| Mowilith LDM 6119, 50% | kg | 15.99 | | | | | | | | |
| Water | kg | 2.45 | | | | | | | | |
| Omyacarb Extra-GU | kg | 39.70 | | | | | | | | |
| Total | kg | 93.00 | 93.00 | 93.00 | 93.00 | 93.00 | 93.00 | 93.00 | 93.00 | 93.00 |
| Matting agents | | | | | | | | | | |
| Celite 281 | kg | | | | | | | | | 7.00 |
| MCC | kg | | 7.00 | 6.30 | 5.60 | 4.90 | 4.20 | 3.50 | | |
| sPCC | kg | | | 0.70 | 1.40 | 2.10 | 2.80 | 3.50 | | |
| Total | | | 100.00 | 100.00 | 100.00 | 100.00 | 100.00 | 100.00 | | 100.00 |

The fillers and pigments were replaced on a volume basis, i.e. at identical Pigment Volume Concentration (PVC). The paints were tested for dry opacity (ISO 2814), whiteness Ry (DIN 53145) and sheen (DIN67530) (gloss at 85°). The components and functions of the materials for the base test paint are commercially available products known to the skilled person and listed in table 5 hereto below.

TABLE 5

Material for Base Paint

| | Producer | Chemical Basis | Function |
|---|---|---|---|
| Water (deionised) | In house | $H_2O$ | solvent |
| Calgon N neu | BK Giulini Chemie | Sodium polyphosphate | Wetting and dispersing agent |
| Bermocoll Prime 3500 | AkzoNobel Corp. | Ethyl Hydroxethly cellulose | Thickener |
| Sodium Hydroxide, 10% | Various | NaOH solution | pH regulator |
| BYK 038 | Byk Chemie | Mineral Oil basis | Defoamer |
| Texanol | Eastman Chemical Company | CAS-Nr. 25265-77-4 | Film forming aid |

TABLE 5-continued

| Material for Base Paint | | | |
|---|---|---|---|
| | Producer | Chemical Basis | Function |
| Butyl Diglycol Acetate | Various | Diethylene Glycol Monobutyl Ether Acetate | Coalescing Agent (Film forming aid) |
| Dowanol DPnB | Dow | Dipropylenglycol-n-butylether | Coalescing Agent (Film forming aid) |
| Coapur 2025 | Coatex | Polyurethane basis | Rheology modifier |
| Byk 349 | Byk | Polyether modified siloxane | Substrate wetting agent |
| Mergal 723 K | Troy | Isothiazolinon (BIT) | Preservative |
| Ecodis P90 | Coatex | Ammonium salt of polyacrylic acid | Wetting and dispersing agent |
| Mowilith LDM 6119, 50% | Celanese | Styrene-Acrylate dispersion | Binder |
| Omyacarb Extra-GU | Omya | Calcium carbonate, marble | extender |

The performance of the tested paints is summarized in table 6, wherein DB1, DB2, DB3, DB4 and DB5 refer to comparative paint examples being obtained from dry blends while R1 (being 100% MCC) and R2 (being Celite 281 of Imerys, a calcined diatomaceous earth) refer to reference paint examples. WBd1 refers to the paint example comprising the blend obtained by the process of the present invention.

TABLE 6

Performance of Paint: Optical Properties at a draw down bar with 150 μm gap and 10 ± 0.5 m²/l
150 μm gap

| Samples | R1 | DB1 | DB2 | DB3 | DB4 | DB5 | WBd1 | R2 |
|---|---|---|---|---|---|---|---|---|
| Ry over white | 88.2 | 88.2 | 88.2 | 88.1 | 88.1 | 88.1 | 87.8 | 88.1 |
| Ry over black | 82.1 | 82.0 | 81.8 | 81.8 | 81.8 | 81.6 | 81.8 | 79.4 |
| Yellowness index | 2.8 | 2.9 | 2.9 | 2.9 | 3.0 | 3.0 | 2.7 | 3.8 |
| Contrast ratio | 93.0 | 93.0 | 92.8 | 92.8 | 92.7 | 92.7 | 93.1 | 90.1 |
| Gloss 85° | 2.5 | 3.0 | 3.6 | 4.6 | 5.7 | 7.3 | 3.5 | 3.6 |

As can be seen from the results of table 6, the example according to the present invention (WBd1) shows a performance in matting effect superior to the dry blend of the same MCC/sPCC ratio DB3 or similar to matting agents of the prior art R2.

The present invention therefore provides for alternative matting agents based on a wet blend of surface modified calcium carbonate and precipitated calcium carbonate, which, when dried and made into a paint provides on one side a better matting effect than a dry blend of the same ratio of surface modified calcium carbonate and precipitated calcium carbonate would provide, while at the same time the production and cost efficiency of the wet blend which subsequently is dried can be improved. Such improved production and cost efficiency is seen when a slurry of 20 wt.-% MCC is blended with a slurry of 54 wt.-% sPCC by 6.21 parts of MCC with 1 part sPCC obtaining a slurry with a MCC/sPCC ratio of 70/30 at solids content of 24.7 wt.-%, which is 4.7 higher than the 20 wt.-% of pure MCC. Thus for obtaining a dry blend of MCC/PCC at a ratio 70/30 with dry starting material more water needs to be eliminated than with wet blending and drying, therefore as a consequence leading improved production efficiency and lower production costs due to less water needed to be eliminated.

The MCC/PCC blend of the present invention can be used in paper and paper coating, tissue paper, digital photo paper, paints, coatings, adhesives, plastics, or as a waste water treating agent.

The invention claimed is:

1. An aqueous slurry comprising a blend of a) surface modified calcium carbonate particles (MCC) and b) precipitated calcium carbonate particles (PCC), and having at least a 5 wt % solids content,
    wherein a) is different from b), and in a weight ratio [MCC/PCC] of from 95:5 to 65:35,
    wherein the modified calcium carbonate particles (MCC) have a particle size distribution $d_{98}/d_{50}$ of <3,
    wherein the precipitated calcium carbonate particles (PCC) have a particle size distribution $d_{98}/d_{50}$ of ≥3.2,
    wherein the blended particles in said blend have a median grain diameter $d_{50}$ of from 5 μm to 100 μm, a BET specific surface area of from 20 m²/g to 150 m²/g, and a particle size distribution $d_{98}/d_{50}$ greater than or equal to 2.0; and
    wherein the precipitated calcium carbonate particles (PCC) consist of products following reaction of carbon dioxide and lime in an aqueous environment or precipitation of a calcium and carbonate ion source in water.

2. The aqueous slurry of claim 1, wherein the surface modified calcium carbonate particles (MCC) in the aqueous slurry are substantially spherical surface modified calcium carbonate particles (bMCC).

3. The aqueous slurry of claim 1, wherein the aqueous slurry includes at least one processing agent selected from ferrous sulfate, ferric sulfate, ferrous chloride, ferric chloride, aluminum sulfate, aluminum chloride, and/or their hydrated forms, silicates, water-soluble cationic polymers, water-soluble amphoteric polymers, water-soluble non-ionic polymers and combinations thereof.

4. The aqueous slurry of claim 1, wherein the precipitated calcium carbonate particles (PCC) in the aqueous slurry have a median grain diameter $d_{50}$ from 0.1 to 100 μm.

5. The aqueous slurry of claim 1, wherein the aqueous slurry has a solids content of at least 15 wt. % based on the total weight of the aqueous slurry.

6. The aqueous slurry according to claim 1, wherein the amount of calcium carbonate in the precipitated calcium carbonate particles (PCC) is between 99.8 and 100 wt.-% based on the total dry weight of the precipitated calcium carbonate particles (PCC).

7. The aqueous slurry according to claim 1, wherein the precipitated calcium carbonate particles (PCC) are of scalenohedral mineralogical crystal form.

8. The aqueous slurry according to claim 1, wherein the amount of calcium carbonate in the precipitated calcium carbonate particles (PCC) is between 90 and 99.8 wt %, based on the total dry weight of the precipitated calcium carbonate comprising particles (PCC).

9. A blend of surface modified calcium carbonate particles (MCC) and precipitated calcium carbonate particles (PCC) in a weight ratio [MCC/PCC] of from 95:5 to 65:35 obtained by drying the aqueous slurry of claim 1.

10. Paper, tissue paper, digital photo paper, paints, coatings, adhesives, plastics, or a waste water treating agent comprising the blend of surface modified calcium carbonate particles (MCC) and precipitated calcium carbonate particles (PCC) of the aqueous slurry of claim 1, or a dried blend thereof.

11. A paint or a coating comprising 1 to 10 wt. % of the blend of surface modified calcium carbonate particles (MCC) and precipitated calcium carbonate particles (PCC) of the aqueous slurry of claim 1, or a dried blend thereof, based on a weight of wet paint or coating present.

12. A method for producing a paint or a coating exhibiting a matte surface when dry, said method comprising incorporating the blend of surface modified calcium carbonate particles (MCC) and precipitated calcium carbonate particles (PCC) of the aqueous slurry of claim 1, or a dried blend thereof, into said paint or coating when wet.

13. The method according to claim 12, wherein the blend of surface modified calcium carbonate particles (MCC) and precipitated calcium carbonate particles (PCC) is present in amounts of 1 to 10 wt.-%, based on a weight of wet paint.

14. An aqueous slurry comprising a blend of surface modified calcium carbonate particles (MCC) and precipitated calcium carbonate particles (PCC) in a weight ratio [MCC/PCC] of from 95:5 to 65:35, having a solids content of at least 15 wt %, and obtained according to the following process:
  a) providing an aqueous slurry of surface modified calcium carbonate particles (MCC), wherein the surface modified calcium carbonate particles (MCC) have:
    i) a median grain diameter $d_{50}$ of from 4 μm to 100 μm, and
    ii) a BET specific surface area of >15 $m^2/g$, and
    iii) a particle size distribution $d_{98}/d_{50}$ of <3;
  b) providing an aqueous slurry of precipitated calcium carbonate particles (PCC), wherein the precipitated calcium carbonate particles (PCC) consist of products of precipitation following reaction of carbon dioxide and lime in an aqueous environment or precipitation of a calcium and carbonate ion source in water and have:
    i) a median grain diameter $d_{50}$ from 0.1 to 100 μm, and
    ii) a BET specific surface area in the range from 1 to 100 $m^2/g$, and
    iii) a particle size distribution $d_{98}/d_{50}$ of >3;
  c) contacting said aqueous slurry of surface modified calcium carbonate particles (MCC) of step a) with said aqueous slurry of precipitated calcium carbonate particles (PCC) of step b) to obtain an aqueous slurry comprising a blend of surface modified calcium carbonate particles (MCC) and precipitated calcium carbonate particles (PCC); and
  d) dewatering the aqueous slurry obtained in step c)
  thereby obtaining the aqueous slurry of at least 15 wt.-% solids content comprising blended particles of surface modified calcium carbonate particles (MCC) and precipitated calcium carbonate particles (PCC), wherein said blended particles have a median grain diameter $d_{50}$ of from 5 μm to 100 μm, a BET specific surface area of from 20 $m^2/g$ to 150 $m^2/g$, and a particle size distribution $d_{98}/d_{50}$ of ≥2.0.

* * * * *